US011622233B2

(12) United States Patent
Tyagi

(10) Patent No.: US 11,622,233 B2
(45) Date of Patent: Apr. 4, 2023

(54) FEDERATED SYSTEM FOR MOBILE DEVICE LOCALIZATION

(71) Applicant: Rakuten Group, Inc., Tokyo (JP)

(72) Inventor: Kunal Tyagi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/822,217

(22) Filed: Mar. 18, 2020

(65) Prior Publication Data

US 2021/0297812 A1 Sep. 23, 2021

(51) Int. Cl.
| | | |
|---|---|---|
| H04W 4/029 | (2018.01) | |
| G01S 5/02 | (2010.01) | |
| G01C 21/00 | (2006.01) | |
| G01S 19/42 | (2010.01) | |
| G01C 21/04 | (2006.01) | |
| G01S 5/14 | (2006.01) | |
| G01C 21/08 | (2006.01) | |
| G01C 21/16 | (2006.01) | |
| G01S 19/52 | (2010.01) | |

(52) U.S. Cl.
CPC .......... *H04W 4/029* (2018.02); *G01C 21/005* (2013.01); *G01S 5/0252* (2013.01); *G01C 21/04* (2013.01); *G01C 21/08* (2013.01); *G01C 21/16* (2013.01); *G01S 5/14* (2013.01); *G01S 19/42* (2013.01); *G01S 19/52* (2013.01)

(58) Field of Classification Search
CPC ..... H04W 4/029; G01C 21/005; G01C 21/04; G01C 21/08; G01C 21/16; G01S 19/42; G01S 19/52; G01S 5/14; G01S 5/0252
See application file for complete search history.

(56) References Cited

U.S. PATENT DOCUMENTS

| | | | | |
|---|---|---|---|---|
| 6,750,813 | B2 * | 6/2004 | Vargas-Hurlston ... | H04W 28/18 342/357.4 |
| 8,385,943 | B1 * | 2/2013 | Han ........................ | H04W 4/33 455/456.1 |
| 11,280,621 | B2 * | 3/2022 | Hu ...................... | G01C 21/3848 |
| 2009/0247186 | A1 * | 10/2009 | Ji .............................. | G01S 5/12 455/456.1 |
| 2010/0137005 | A1 * | 6/2010 | Zeng ......................... | G01S 5/14 455/456.6 |
| 2014/0141803 | A1 * | 5/2014 | Marti .................... | G01S 5/0278 455/456.2 |
| 2017/0272911 | A1 * | 9/2017 | Agrawal ............. | H04L 61/6022 |

* cited by examiner

*Primary Examiner* — Steven S Kelley
(74) *Attorney, Agent, or Firm* — Sughrue Mion, PLLC

(57) ABSTRACT

A method, computer program, and computer system of a base station is provided for determining a location of a mobile device by receiving data from a mobile device associated with a location of the mobile device and generating a world model database corresponding to a physical location of the base station. The received data is constrained based on the generated world model database, and an updated location of the mobile device is determined based on the constrained data.

20 Claims, 8 Drawing Sheets

FEDERATED SYSTEM FOR MOBILE DEVICE LOCALIZATION

BACKGROUND

1. Field

This disclosure relates generally to the field of navigation, and more particularly to mobile device localization.

2. Description of Related Art

The global positioning system (GPS) is a satellite-based radio-navigation system that provides geolocation and time information to a GPS receiver. Each of the GPS satellites continuously transmits a radio signal containing the current time and data about its position. Since the speed of radio waves is constant and independent of the satellites' speed, the time delay between when each satellite transmits a signal and when the receiver receives it is proportional to the distance from each satellite to the receiver. A GPS receiver monitors multiple satellites and solves equations to determine the precise position of the receiver and its deviation from true time. The GPS does not require the user to transmit any data, and it operates independently of any telephonic or internet reception.

SUMMARY

Provided are a method, system, and computer readable medium for device localization that uses a world model and is not GPS-reliant.

Also provided are a method, system, and computer readable medium for enhancing global positioning system (GPS) location data using a world model.

According to an aspect of an embodiment, there is provided a method of determining a location of a mobile device, the method including: receiving, by a base station, data from a mobile device, wherein the data is associated with a location of the mobile device; generating or updating a world model database, the world model database corresponding to a physical location (or coverage area) of the base station; constraining the received data based on the world model database; and determining a location of the mobile device based on the constrained data.

According to an aspect of another embodiment, there is provided a computer system of a base station for determining a location of a mobile device, the computer system including: one or more computer-readable non-transitory storage media configured to store computer program code; and one or more computer processors configured to access said computer program code and operate as instructed by said computer program code, said computer program code including: receiving code configured to cause the one or more computer processors to receive data from a mobile device, wherein the data is associated with a location of the mobile device; generating or updating code configured to cause the one or more computer processors to generate or update a world model database corresponding to a physical location of the base station; constraining code configured to cause the one or more computer processors to constrain the received data based on the world model database; and determining code configured to cause the one or more computer processors to determine a location of the mobile device based on the constrained data.

According to an aspect of another embodiment, there is provided a non-transitory computer readable medium having stored thereon a computer program for determining a location of a mobile device, the computer program configured to cause one or more computer processors of a computing device of a base station to: receive data from a mobile device, wherein the data is associated with a location of the mobile device; generate or update a world model database corresponding to a physical location of the base station; constrain the received data based on the world model database; and determine a location of the mobile device based on the constrained data.

Additional aspects will be apparent or set forth, at least in part, in the description that follows, or may be understood by practice of presented embodiments.

BRIEF DESCRIPTION OF THE DRAWINGS

These and/or other aspects will become apparent and more readily appreciated from the following description, taken in conjunction with the accompanying drawings in which.

DETAILED DESCRIPTION

Figure 1:
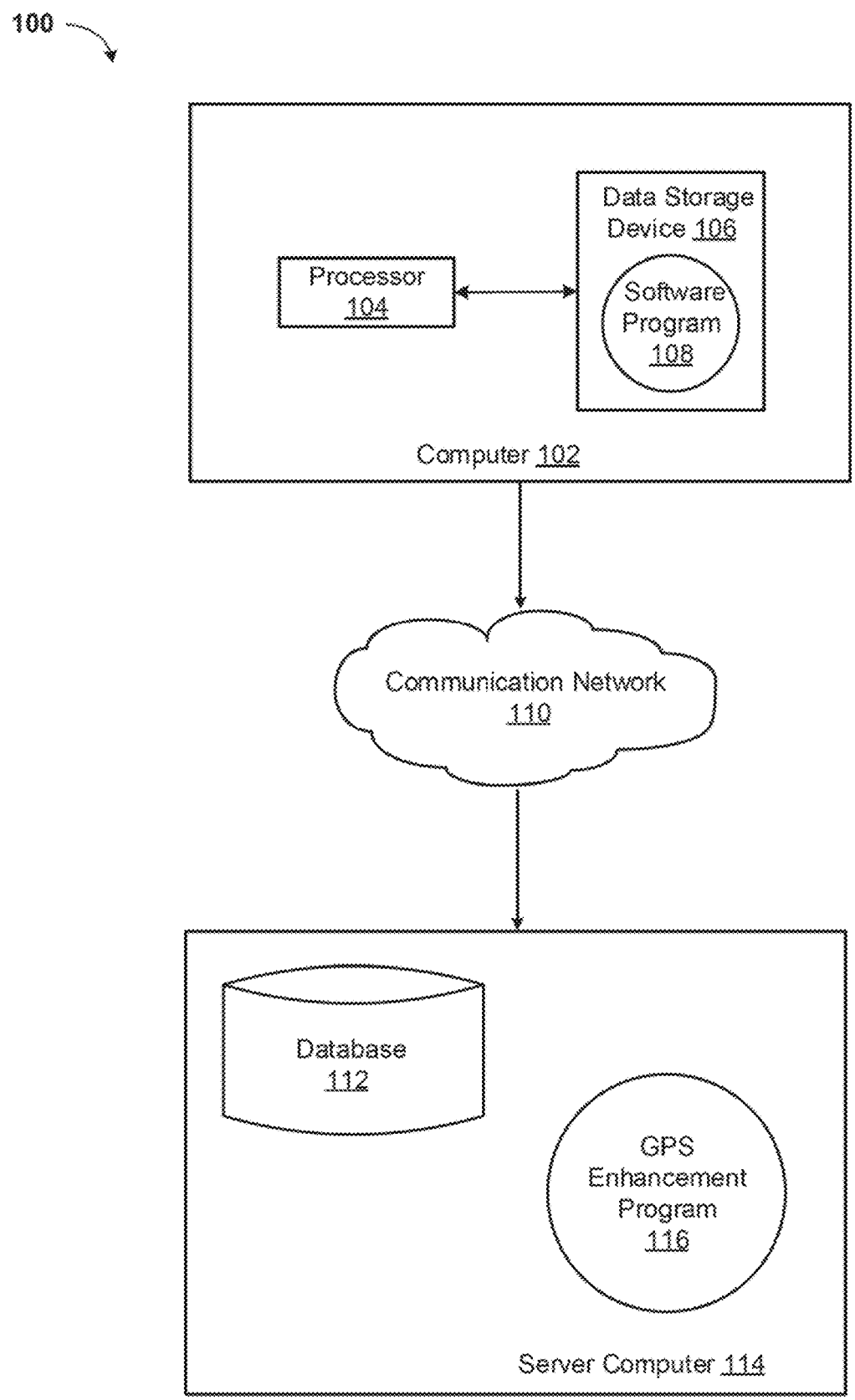
FIG. 1 illustrates a computer environment for a federated positioning system according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Further, it is understood that as used herein, expressions such as "at least one of," when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

It is also understood that, although the terms "first," "second," etc., may be used herein to describe various elements, these elements should not be limited by these terms (e.g., should not be interpreted as designating a relative order or significance). These terms are only used to distinguish one element from another.

Additionally, as used herein, the singular forms "a," "an" and "the" are intended to include the plural forms as well, unless otherwise indicated explicitly or by the surrounding context.

One or more embodiments of the present disclosure relate generally to the field of navigation, and more particularly to positioning systems. One or more exemplary embodiments provide a system, method and program product to, among other things, enhance GPS location data. Therefore, some embodiments have the capacity to improve the field of computing by allowing for the enhancement of received GPS data by a computer using a world model to constrain the GPS data.

One or more exemplary embodiments also provide a system, method, and program product to, among other things, provide device localization that is not GPS-reliant, and in some implementations may not use GPS at all to obtain a device's position.

As previously described, the global positioning system (GPS) is a satellite-based radio-navigation system that provides geolocation and time information to a GPS receiver. Each of the GPS satellites continuously transmits a radio signal containing the current time and data about its position. Since the speed of radio waves is constant and independent of the satellites' speed, the time delay between when each satellite transmits a signal and when the receiver receives it is proportional to the distance from each satellite to the receiver. A GPS receiver monitors multiple satellites and solves equations to determine the precise position of the receiver and its deviation from true time. The GPS may not require the user to transmit any data, and it operates independently of any telephonic or internet reception. However, telephonic and internet reception may be used to augment GPS data. For example, GPS receivers in devices such as mobile phones may enhance the data received from the GPS satellites to update a position based on a Wireless-Fidelity (Wi-Fi) or cellular network.

In certain environments, GPS-based navigation and positioning systems cannot accurately provide location data. For example, a device may be unable to receive a GPS signal or may endure a prolonged GPS startup (time-to-first-fix) time due to poor satellite signal conditions. In certain areas, such as urban areas, there may be exceedingly poor signal conditions such that GPS signals may exhibit multipath propagation where signals deflect off buildings and other structures, or are weakened by weather conditions or tree canopies. It may be advantageous, therefore, to transmit GPS location data from a GPS receiver to a fixed terrestrial base station for enhancement and error-correction of the GPS location data. But even with such enhancement methods, there remain issues including location inaccuracy, additionally required radios or devices in user equipment, dynamically-changing variables (e.g., power) in base stations that are unknown to the user equipment, errors resulting from phase difference, low information bandwidth or low range for communication with base station, etc.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and program product that enhances GPS location data or provides device positioning and localization without using or being reliant on GPS location data, by using a generated world model and a federated system of base stations. Each base station may maintain a corresponding world model of its vicinity, i.e., a ground reality of its vicinity. According to an embodiment, the distances between base stations 204 in the federated system may be less than 1 km. In this regard, by utilizing base stations within 1 km, the distance between the device and the base station will be low, thereby minimizing or avoiding problems of changes in GPS signals or location data due to multipath errors, and minimizing the occurrence of noise resulting from being underground, near tall buildings, etc.

FIG. 1 illustrates a functional block diagram of a computer environment of a federated positioning system 100 (hereinafter "system") for accurate device localization. For example, the federated positioning system 100 may be a GPS enhancement system for improved enhancement and error-correction of GPS location data. Further, the federated positioning system 100 may not use GPS data at all, or may not be reliant on GPS data, including when GPS data is unavailable. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server or base station computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 8 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may be included in a base station (as described below with reference to FIG. 2) for a communication network 110 that is a cellular or mobile communication network. The server computer 114, which may be used for determining a device's location or enhancing location data (e.g., enhancing GPS location data), is enabled to run a device localization program (e.g., a GPS Enhancement Program 116) (hereinafter "program") that may interact with a database 112 (e.g., world model). The device localization program method according to an embodiment is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger program (e.g., a larger localization program or GPS enhancement program).

It should be noted, however, that processing for the program 116 may, in some instances, be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. According to an embodiment, the network 110 may include a cellular network (e.g., a fifth generation (5G) network, a long-term evolution (LTE) network, a fourth generation (4G) network, a third generation (3G) network, a code division multiple access (CDMA) network, etc.). It is understood, however, that one or more other embodiments are not limited thereto and may additionally or alternatively include any combination of connections and protocols that will support communications between the computer 102 and the server computer 114. For example, in addition or alternate to the cellular network, the network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
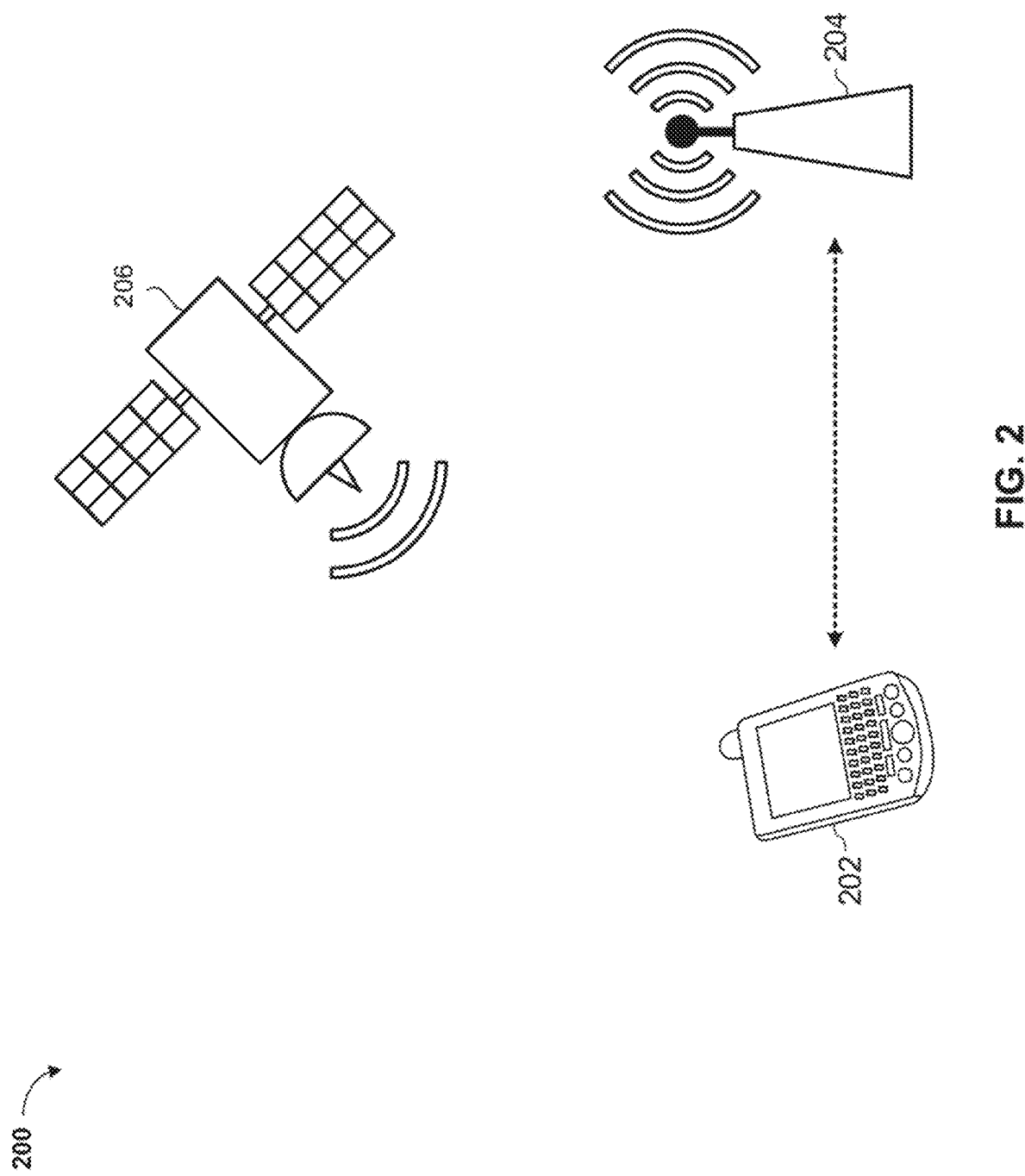
FIG. 2 is a block diagram of a device localization system, according to at least one embodiment.

Referring now to FIG. 2, a block diagram 200 of a device localization system (e.g., GPS Enhancement System) is depicted. FIG. 2 may be described with the aid of the exemplary embodiment depicted in FIG. 1. The device localization system may accordingly include, among other things, a mobile device 202 and a base station 204. The base station 204 may be configured to run a device localization program (such as the GPS Enhancement Program 116 (FIG. 1)). The mobile device 202 and the base station 204 may receive GPS data from one or more GPS satellites 206. Here, the base station 204 may be a communication base station (e.g., a communication base station close to a GPS base station), or a combination of a GPS base station and a communication base station. For example, the communication base station may receive data (e.g., GPS data) from a close GPS base station such that the data can be used as is or to drive the location of the communication base station. In this regard, for a communication base station with a circular coverage area, the GPS base station may be at or near the center (i.e., where the communication base station is located). For an oriented communication base station, however, the GPS base station can be farther away. Some examples include: the GPS base station can be located at a known offset to the center of the coverage area to obtain the actual GPS signals received by the mobile device 202; the GPS base station may be located at a bottom of the base station tower while the communication base station is located at the top of the base station tower (by way of example, the vertical distance can be as large as a few hundred meters); and the GPS base station can be located with an offset along a horizontal plane relative to the communication base station. Further, the federated positioning system according to an embodiment may include a minimum of four GPS satellites. According to another embodiment, the federated positioning system may not use GPS data, or may only use GPS data for generating and/or optimizing a world model.

The mobile device 202 may use the GPS signal data received from the GPS satellites 206 to determine data associated with a location. Alternatively, the data associated with location may not include GPS data (e.g., if unavailable or if the system according to another embodiment does not utilize GPS satellites 206 for localization). For example, the mobile device 202 may use signals and/or signal information from surrounding Wireless Fidelity (Wi-Fi) access points, Bluetooth beacons, etc., to obtain or determine location data. The data associated with location may include, among other things, at least one of: a time associated with the mobile device 202; a position and velocity of the mobile device 202 based on one or more GPS signals; a signal strength value of the GPS signals; lists of Wi-Fi access points, Bluetooth beacons, and cellular network base stations available to the mobile device 202 and their respective signal strengths; a magnetic field vector based on a strength value and a direction at the position of the mobile device 202; inertial measurement unit data associated with the mobile device 202; and ambient atmospheric temperature, humidity, and pressure data associated with the location of the mobile device 202. The data associated with location may be transmitted by the mobile device 202 to the base station 204 for augmentation and/or device localization using a world model maintained at the base station 204 (or a connected server). Additionally, the location data may be transmitted to the base station 204 for creating a world model, updating a world model, or optimizing a world model.

The base station 204 may, among other things, maintain a world model of its vicinity for error correction, such that a central server may not be required. The base station 204 may use one or more mobile networks to estimate a position of the mobile device 202 using time delay of arrival or a phase-based direction of arrival. The base station 204 may also perform a real-time kinematic style of error correction using the mobile network data without requiring special equipment. The base station 204 may perform long-term building of a world model using both automatic methods (e.g., real-time kinematic GPS, cellular network-based position) and manual methods (e.g., manually inserted survey points with known value of GPS error due to multipath propagation and signal reflection).

Although only one mobile device 202, one base station 204, and one GPS satellite 206 are depicted in FIG. 2, it may be appreciated, however, that the system may use any number of mobile devices 202, base stations 204, and GPS satellites 206. For example, one or more base stations 204 may be added or removed based on demand, and multiple base stations 204 may overlap without requiring additional configuration due to mobile network standards. Because each base station 204 maintains a world model of its vicinity, there is no need for a central server. According to an embodiment, the distances between base stations 204 in the federated system may be less than 1 km. In this regard, by utilizing base stations within 1 km, the distance between the mobile device 202 and the base station 204 will be low, thereby minimizing or avoiding problems of changes in GPS signals or location data due to multipath errors, and minimizing the occurrence of noise resulting from being underground, near tall buildings, etc.

Figure 3:
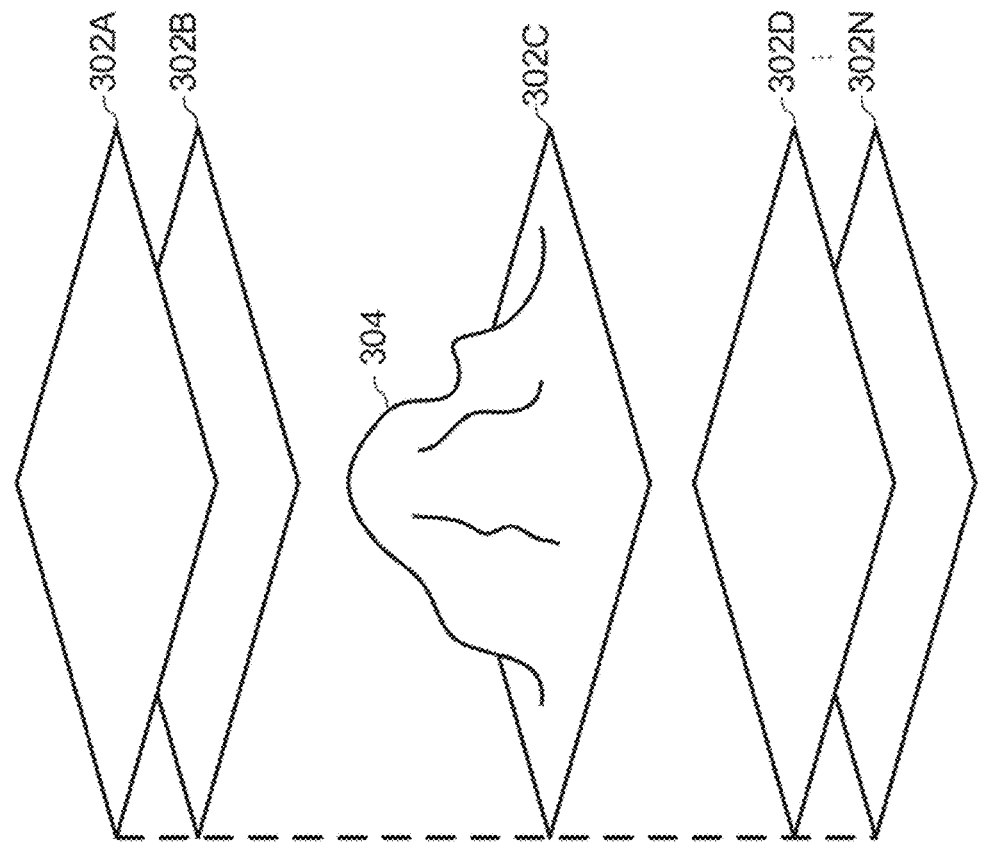
FIG. 3 is an exemplary representation of a world model, according to at least one embodiment.

Referring to FIG. 3, an exemplary representation of a world model 300 is depicted. The world model 300 may be a multi-layer model or database that may include one or more layers 302A-302N. The world model may be generated by closely correlating environment data with a data collection pose (position and orientate) that can be expected (based on sensor characteristics) to be noisy in absolute pose but accurate in relative motion. By way of example and not of limitation, the layers 302A-302N may include, among other things, at least one of a magnetic field deviation layer 302A, a weather layer 302B (e.g., humidity and wind speeds), a geographic information system (GIS) layer 302C that may include information on one or more features 304 (e.g., a building, a road, a bridge, a tunnel, a landform, or a body of water), and one or more layers 302D-302N that may correspond to one or more signals (e.g., a Wireless Fidelity (Wi-Fi) signal, a Bluetooth signal, a GPS signal, and a cellular network signal). The signal layers 302D-302N may be configured to provide a signal strength at a position (for example, using data from the GIS) for one or more sources having a known position and signal transmission strength. The signal layers 302D-302N may also be configured to model the one or more signals for signal strength propagation loss for one or more sources having uncertainty in either a position or signal transmission strength. It may be appreciated that many other layers may be included within the world model 300, and each type of signal and environment data that is collected may have its own layer in the world model 300.

The world model 300 may be optimized with data received from one or more additional mobile devices 202 (FIG. 2). For example, the magnetic field deviation layer 302A may be updated with data based on the constraint position and time of the mobile devices 202. The GIS layer 302C may be updated with fingerprinting of available anchors, including signal-to-noise ratio for known anchors and raw signal strengths for unknown anchors. Here, fingerprinting may refer to information related to spatio-temporal distribution of identifying data, such as anchor label, and may not include specific data such as signal strength. Further, the anchors may refer to mathematical entities that can be used to model data (such as signal strength) with high accuracy. Anchors may include sources of wireless emission or magnetic deviation, visual landmarks, statistical landmarks (e.g., staircase where inertial data is predictably anomalous, etc.). For anchors with unknown positions, motion models may be created based on a simple shift from one position or signal strength to another (e.g., relocation of Wi-Fi-router, door opening or closing), a temporal shift from one position or signal strength to another (e.g., movement of a Wi-Fi-router in a vehicle), or unknown shifts that may occur at fast frequencies, such as vibration or changes in weather conditions. These anchors may be marked for only fingerprinting and not high fidelity localization. The signal layers 302D-302N may be used to create probable position and transmission characteristics of anchors with unknown positions, constrained by received data, including multiple models with varying complexity such as mixture-model, and Markov models. For the anchors with valid models for motion and valid transmission characteristics, probable areas for each valid combination may be computed. The probable areas may be used to update the GIS layer 302C with fingerprinting data of visible anchors to create probable area for future mobile devices 202. For anchors whose position and transmission characteristics are now known with high confidence, these may be whitelisted. Once sufficient data may be available, the position of the mobile devices 202 and the world model 300 may be correlated. If there is insufficient information, the optimization of the position data of the mobile devices 202 and the world model 300 may be repeated iteratively until equilibrium is reached. Alternatively, the optimization may be a continuous process that is performed in real time, periodically, or in response to any or certain location data received from mobile devices 202.

Figure 4:
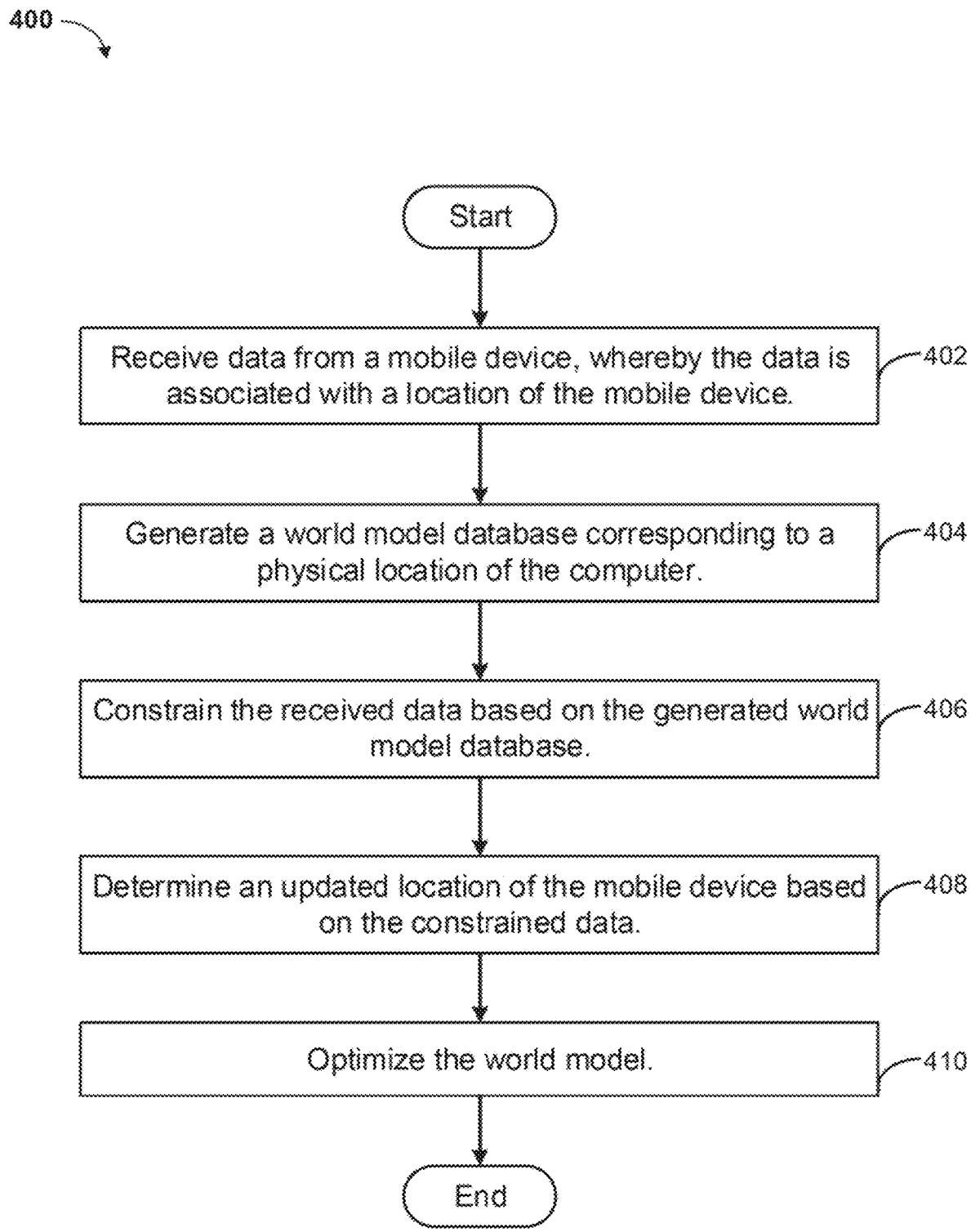
FIG. 4 is an operational flowchart illustrating operations carried out by a program for device localization, according to at least one embodiment.

Referring now to FIG. 4, an operational flowchart 400 illustrating the operations carried out by a program for device localization (e.g., a program that enhances GPS location data) is depicted. FIG. 4 may be described with the aid of FIGS. 1, 2, and 3. As previously described, the device localization program (e.g., GPS Enhancement Program 116 (FIG. 1)) may quickly and effectively obtain or enhance location data (e.g., enhance GPS location data) using a generated world model database.

At operation 402, data is received by a computer (e.g., base station computer) from a device, e.g., mobile device, computer, processing device, etc., whereby the data is associated with a location of the device. The categories of data may include, among other things, at least one of: signal strength and/or direction, details regarding transmission frequency, transmission medium, and a category of transmission anchors; additional environment data not based on anchors (e.g., for long range coherence); and process based data (e.g., for short range coherence). The transmission anchors may include, among other things, at least one of: radio anchor points, including emitting sources such as radio towers, Wi-Fi routers and hotspots, Bluetooth beacons, a telecommunication base stations; audio anchor points, such as speakers and high frequency emitters; details such as transmission power, weather conditions, runtime measure of propagation loss; and a location of anchor points. The additional environment data may include, among others, at least one of: magnetometer data such as magnetic field vector data and reported acceleration values; image data from a camera for determining features and visual markers; GPS data, such as signal strength. The process based data may include, among others, at least one of inertial measurement unit (IMU) data; visual motion data (e.g., from one or more cameras); and processed data from other sources such as velocity from a vehicle odometer, third party sources, etc. In operation, the mobile device 202 (FIG. 2) may determine a location based on one or more GPS satellites 206 (FIG. 2) and may transmit the location data and other data to the base station 204 (FIG. 2).

At operation 404, a world model corresponding to a physical location (or coverage area) of the computer (e.g., base station computer) is generated. The world model may be a database with multiple layers that is created from the received data. In operation, the base station 204 (FIG. 2) may create the world model 300 (FIG. 3) with one or more layers 302A-302N (FIG. 3) based on the data received from the mobile device 202 (FIG. 2), data received from external sources (e.g., third party database), and/or data collected for generating the world model 300 (e.g., using a robot or device commissioned to collect data along a predefined trajectory or at a predefined area). For example, the magnetic field deviation layer 302A may be created using magnetometer data from the mobile device 202, and the weather layer 302B may be created from the temperature, altitude, and pressure data from the mobile device 202.

At operation 406, the received data is constrained based on the generated world model database. The mobile device position may be estimated to a higher accuracy, and the one or more layers of the world model database may be applied to the set initial location based on a probability value associated with the one or more layers exceeding a threshold value. The constraints may be zero if no prior information is available. GPS may be used to create an initial constraint on the mobile device's position, and fingerprinting data may be used to add additional constraints. Anchors with known positions may have high confidence and may be used to further constrain the position of the mobile device. In the event of a conflict, the confidence level may be lowered, such that a minimum number of anchors may be relaxed by the least amount possible for data to be properly constrained. The list of anchors may be refreshed, and anchors below a threshold confidence level may be removed from the list of anchors (or given a lower weight). In operation, the base station 204 (FIG. 2) may apply the layers 302A-302N (FIG. 3) to the location data received from the mobile device 202 (FIG. 2). The base station 204 may use the GPS position as an initial constraint and may apply, for example, data from the magnetic field deviation layer 302A to form an additional constraint on the location of the mobile device 202.

At operation 408, a location (or an updated location) of the mobile device is determined based on the constrained data. At the end of the constraint process, the position of the mobile device may be known with higher confidence, and errors in the initial position may be corrected. In operation, the base station 204 (FIG. 2) may use the data of the world model 300 (FIG. 3) to determine a more accurate location of the mobile device 202 (FIG. 2). The base station 204 may optionally transmit the updated location data back to the mobile device 202.

At operation 410, the world model is optimized. One or more of the layers may be updated based on receiving data from one or more additional mobile devices. A probability of position and transmission characteristics may be determined for the updated layers, and anchors with position and transmission characteristics having a probability greater than a threshold value may be whitelisted. In operation, the layers 302A-302N (FIG. 3) of the world model 300 (FIG. 3) may be optimized using the data received from one or more mobile devices 202 (FIG. 2). The optimization may allow the base station 204 (FIG. 2) to provide more accurate location data to the mobile device 202 based on the world model 300.

It may be appreciated that FIG. 4 provides only an illustration of one implementation and does not imply any limitations with regard to how different embodiments may be implemented. Many modifications to the depicted environments may be made based on design and implementation requirements.

According to various other embodiments, one or more operations in FIG. 4 may be omitted. For example, where the world model is previously generated, operation 404 may be omitted. In this case, location data may be received from the mobile device, and a location of the mobile device may be determined (or updated) by inputting or correlating the received location data to the world model. Further, in this case, the optimization of operation 410 based on the received location data may or may not be omitted.

Figure 5:
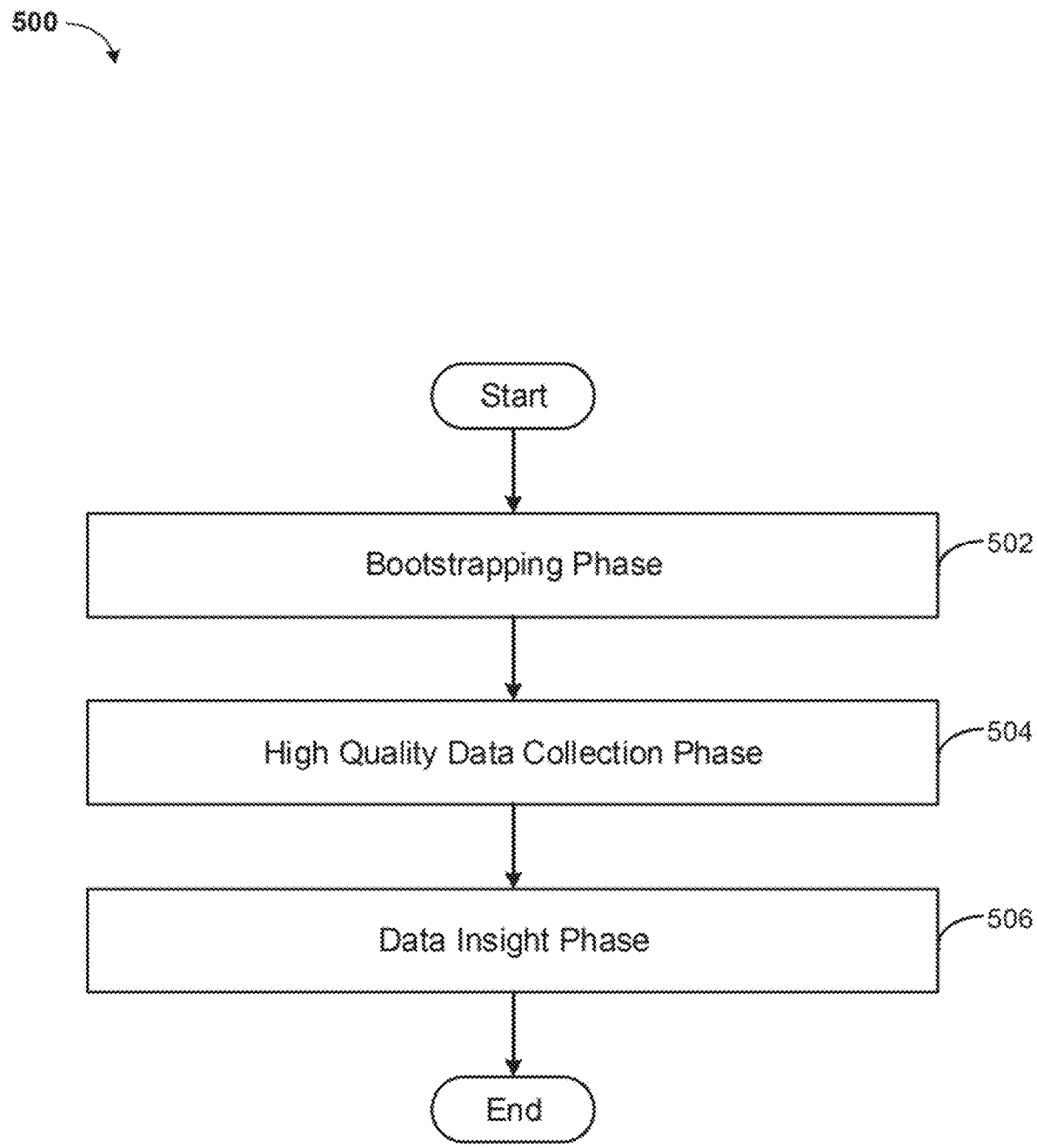
FIG. 5 is flowchart illustrating a method of generating a world model according to at least one embodiment.

FIG. 5 is flowchart 500 illustrating a method of generating a world model according to at least one embodiment. The world model may initially be created by each Base Station with respect to its surrounding area or designated environment, to calculate a ground reality. These world models may then be interpolated in order to fix or fill in any missing areas using, for example, models of strength propagation for each particular signal's wavelength.

Operation 502 corresponds to a bootstrapping phase in which data is collected and the world model is built. For example, in the bootstrapping phase, the data is collected and the world model is built using signals with estimated low to medium errors. The data may be collected from user equipment (e.g., the mobile devices 202) or dedicated data collection equipment (e.g., robots or equipment commissioned to collect data from designated areas, e.g., the area and buildings surrounding the Base Station). The data points collected in the bootstrapping phase may include sensor information and a corresponding location.

In further detail, the world model can be bootstrapped using at least one of offline and online methods, as described above. Offline methods may, among other things, increase accuracy in areas with high error rates. For example, a sensor with an accurate GPS receiver may be taken around a building's floorplan. The sensor may be moved in a predefined or well-known location trajectory and the error between the sensor and the trajectory may be used to create a map of "errors" (i.e., a difference in location found via blueprints or using other sensors). The error map may be used to equalize noisy data from GPS, cellular networks and wireless networks and to compute statistics such as mean, standard deviation, and offset.

Online methods may be adaptable to change and may be used for bootstrapping. For example, one or more select users may provide high accuracy information such as inertial measurement unit (IMU) data, Bluetooth data, wireless signal data, and video data in addition to standard GPS and cellular network data. Further, a large amount of noisier data may be used to create an error map, with improvements being iterative as more and more data is collected and added. In this regard, the different sessions of collected data may be matched, smoothed, and interpolated to minimize differences therebetween.

For either method, simultaneous localization and mapping (SLAM) algorithms (including those in the related art) may be used to create the world model, that is, a representation of the ground reality. Further, particle filters and Discrete Markov Processes may be used to model and find the mobile device's motion and estimated position. Data on one band may be corroborated with data on another band to determine at least one error statistic (e.g., a rate of error), and multiple changes over time may be used to disambiguate confusing scenarios further. Here, a band may refer to a combination of layers from which meaningful insight(s) regarding location can be obtained or gathered. Data from multiple bands may be used to determine error statistics. Additionally, data collected from multiple mobile devices can be used to model the movement path and determine patterns to reduce errors even further. The movement-path models and error models around an antenna may be generated if the mobile device can send its location information to the network. A world model may be created by a base station corresponding to its nearby geographic area. One or more error models may be interpolated to determine missing areas using models of strength propagation for each particular wavelength.

In the bootstrapping phase (operation 502), data collected from the mobile devices may give a position of one or more landmarks, such as deviations in Earth's magnetic field due to structures like desks, doors, walls, or power lines and a distance to one or more access points for Wi-Fi, Bluetooth, and cellular networks. These measurements may form constraints with one end inside the area of mobile devices (i.e., position plus error value) and the other end at the landmark location such that the constraint may have a boundary of measurement noise. Since the spatio-temporal behavior of anchors is known, constraints from a position of a mobile device to landmark position over multiple samples collected across time and mobile devices may be used to find valid positions of landmarks.

Next, operation 504 corresponds to a high quality data collection phase. Here, high quality data may be collected using external sensors (e.g., LiDAR) to reduce mobile device position error in order to build the world model. This may be used in places where bootstrapping may not work for reasons such as lack of sufficient users (e.g., in areas having low population density or difficult to access) and lack of signals with low errors (e.g., in subway tunnels).

The categories of data collected in the bootstrapping phase (operation 502) and/or the high quality data collection phase (operation 504) (or computer, processing device, etc.) may include, among other things, at least one of: signal strength and/or direction, details regarding transmission frequency, transmission medium, and a category of transmission anchors; additional environment data not based on anchors (e.g., for long range coherence); and process based data (e.g., for short range coherence). The transmission anchors may include, among other things, at least one of: radio anchor points, including emitting sources such as radio towers, Wi-Fi routers and hotspots, Bluetooth beacons, a telecommunication base stations; audio anchor points, such as speakers and high frequency emitters; details such as transmission power, weather conditions, runtime measure of propagation loss; and a location of anchor points. The additional environment data may include, among others, at least one of: magnetometer data such as magnetic field vector data and reported acceleration values; image data from a camera for determining features and visual markers; GPS data, such as signal strength. The process based data may include, among others, at least one of inertial measurement unit (IMU) data; visual motion data (e.g., from one or more cameras); and processed data from other sources such as velocity from a vehicle odometer, third party sources, etc. Other data may also be collected for bootstrapping (e.g., fingerprinting data, as discussed below).

Operation 506 corresponds to a data insight phase. This phase may include using the world model with additional data such as blueprints for urban areas and ground use statistics for open areas. These may be used to determine signal strength changes for different materials due to reflection, refraction, and pass-through loss differently. The additional data may also be used to determine noise levels at locations to determine the error at a location based on time or mobile device model independently from a mobile device's observations. This may eliminate noise by finding patterns that may occur over time such as high error during peak hours due to large number of people. The additional data may also be used to create interpolation models based on how the strength of different signals may be affected by weather and nearby obstacles.

Figure 6:
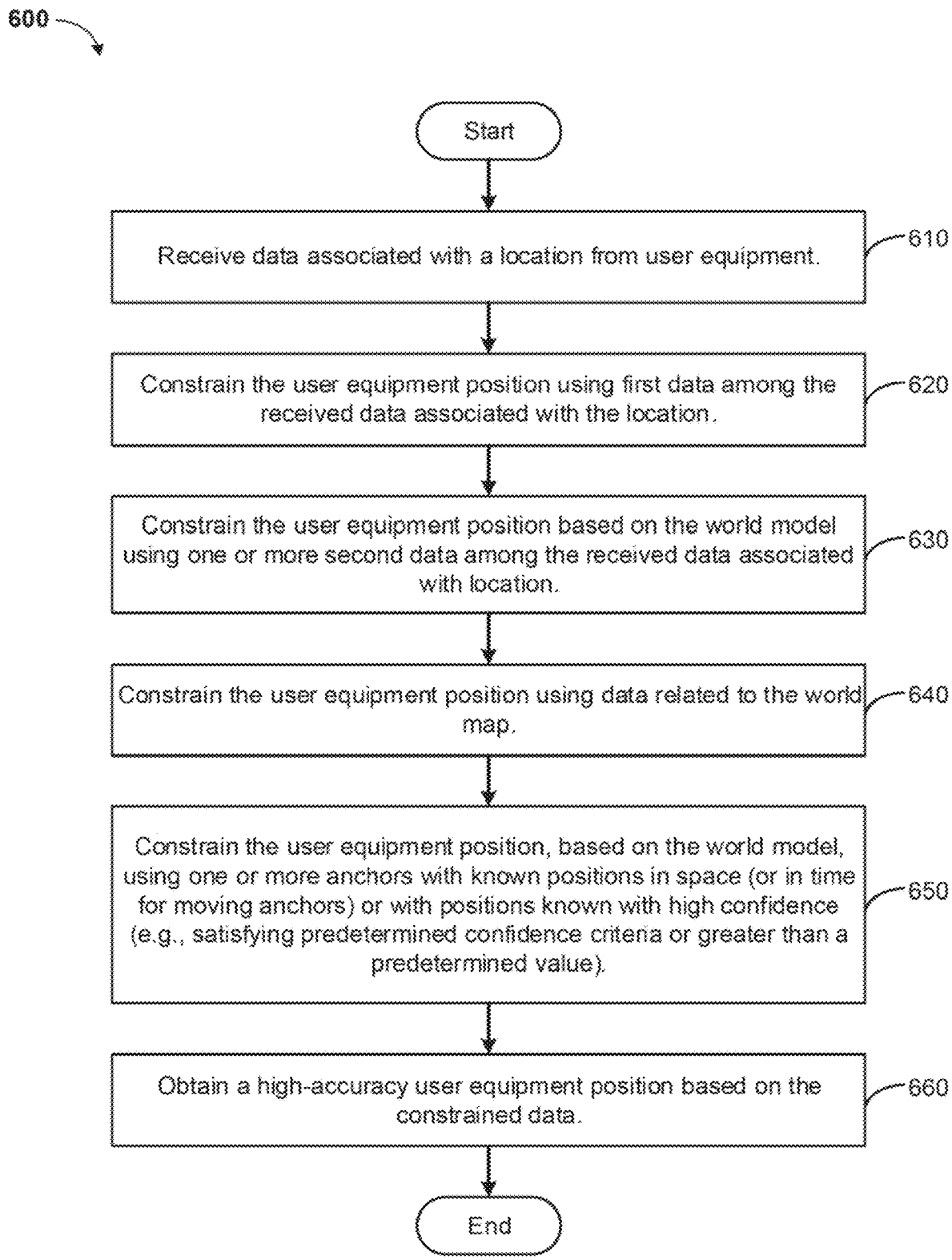
FIG. 6 is a flowchart illustrating a method of estimating user equipment position based on a world model according to at least one embodiment.

FIG. 6 is a flowchart 600 illustrating a method of estimating user equipment position based on a world model according to at least one embodiment. The method of FIG. 6 may be performed by a Base Station included in the federated system for device localization according to one or more embodiments. Further, the method of FIG. 6 may be performed to generate or update a world model and/or to determine a location of user equipment (e.g., mobile device 202) or equipment for updating the world model (e.g., robot, data collection device, etc.).

In operation 610, data associated with location is received from a user equipment (e.g., mobile device). This data may include, among other things, at least one of GPS data, a time associated with the user equipment, a position and velocity of the user equipment based, for example, on one or more GPS signals, a signal strength value of the GPS signals, a list of Wi-Fi access points, Bluetooth beacons, and cellular network base stations available to the user equipment and/or their respective signal strengths, a magnetic field vector based on a strength value and a direction at the position of the user equipment, inertial measurement unit data associated with the user equipment, and ambient atmospheric temperature, humidity, and pressure data associated with the location of the user equipment.

In operation 620, first data among the received data associated with location is used to constrain the user equipment position (e.g., to create an initial constraint on the user equipment position). For example, the first data may be GPS data or any other data that is directly related to the location of the user (e.g., estimate position). The first data may be referred to as primary data.

In operation 630, one or more second data among the received data associated with location is used to constrain (e.g., add constraints on) the user equipment position based on the world model. The second data may be referred to as secondary data and may not be directly related to the location of the user. For example, fingerprinting data among the received data may be used to add further constraints. Here, the fingerprinting data may be data that identifies or can be used to identify or determine a landmark (e.g., a name of a landmark). By way of example, radio fingerprinting data may include the name of a Wi-Fi network or access point (such as "Wi-Fi STARBUCKS"), which would indicate that the user equipment is near a particular (e.g., known) location (e.g., STARBUCKS). The radio fingerprinting data received from the user equipment may include a list of Wi-Fi access points available to the user equipment. The second data is used to constrain the user equipment position based on the world model. For example, if the GPS data constrains the position to a first area (A), and the world model indicates that the received fingerprint data (e.g., STARBUCKS) corresponds to a second area (B), the device position would be constrained to an overlapping area (C) of the first area (A) and the second area (B).

In operation 640, data related to the world map is used to constrain (e.g., further constrain) the user equipment position. For example, where the received primary and secondary data constrains the device position to area C in operations 620 and 630, and the world map indicates that area C includes a portion D that corresponds to an anchor for which no fingerprint or location data is received, then the device position would be further constrained within area C to exclude the overlapping portion D.

In operation 650, anchors with known positions in space (or in time for moving anchors), or with positions known with high confidence (e.g., satisfying predetermined confidence criteria or greater than a predetermined value), are used to constrain (e.g., further constrain) the user equipment position, based on the world model. The anchors may, for example, include, among other things, at least one of: radio anchor points, including emitting sources such as radio towers, Wi-Fi routers and hotspots, Bluetooth beacons (e.g., a Bluetooth beacon used for advertising), a telecommunication base stations; audio anchor points, such as speakers and high frequency emitters; details such as transmission power, weather conditions, runtime measure of propagation loss; and a location of anchor points. If there is a conflict, the confidence on the anchor may be relaxed or reduced. For example, if the STARBUCKS router is an anchor in the world model for an area encompassing the constrained position data, but is not detected among the received data, then there would be a conflict and the confidence in this anchor would be reduced. In case of such conflicts, a minimum number of anchors may be relaxed by a least amount possible for the data to be properly constrained. Next, the list of anchors may be refreshed such that those that have a confidence below a preset threshold are removed from the list of anchors.

It is understood that in various embodiments operations 620 to 650 may be performed in sequential order, or may be performed in any order. Further, it is understood that the data received in operation 610 may be received sequentially and may be received in part while operations 620 to 650 are performed. Further, it is understood that at least some of operations 620 to 650 (e.g., operation 640 and 650) may be repeatedly performed, e.g., for all data across time, user equipment, and space.

In operation 660, a user equipment position of high accuracy is obtained based on the data constrained in operations 620 to 660.

Figure 7:
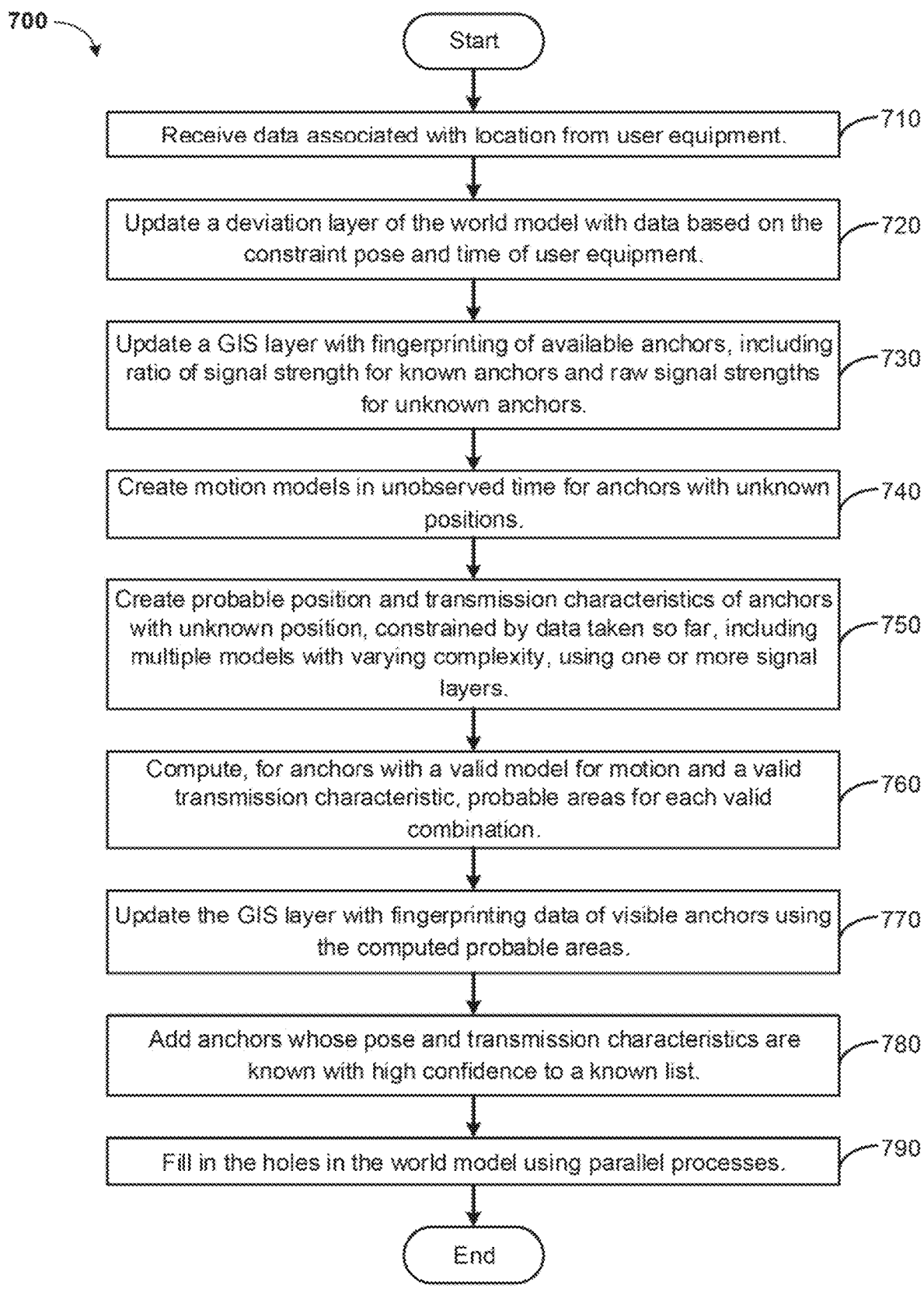
FIG. 7 is a flowchart illustrating a method of optimizing a world model for detecting a position of user equipment according to at least one embodiment.

FIG. 7 is a flowchart 700 illustrating a method of optimizing a world model for detecting a position of user equipment according to at least one embodiment. The method of FIG. 8 may be performed by a Base Station included in the federated system for device localization according to one or more embodiments. The method of FIG. 8 may be performed to optimize a previously-generated world model.

In operation 710, data associated with location is received from a user equipment (e.g., mobile device). This data may include, among other things, at least one of GPS data, a time associated with the user equipment, a position and velocity of the user equipment based, for example, on one or more GPS signals, a signal strength value of the GPS signals, a list of Wi-Fi access points, Bluetooth beacons, and cellular network base stations available to the user equipment and/or their respective signal strengths, a magnetic field vector based on a strength value and a direction at the position of the user equipment, inertial measurement unit data associated with the user equipment, and ambient atmospheric temperature, humidity, and pressure data associated with the location of the user equipment. Further, the method of FIG. 7 may be performed subsequently to or in connection with the method of FIG. 6, such that operation 710 may be omitted and the data may be as obtained in operation 610, and the optimizing may occur in real time. In this regard, the user equipment position and the world model may be optimized together according to one or more embodiments.

In operation 720, a deviation layer (e.g., the magnetic field deviation layer) of the world model is updated with data based on the constraint pose and time of user equipment. By way of example, the magnetic field deviation layer includes the magnetic north at a point as well as the location of true north. Since the mobile device sensors provide magnetic north, the deviation layer is used to convert the magnetic north to actual north as well as extract any local influence (e.g., magnetic material).

In operation 730, the GIS layer is updated with fingerprinting of available anchors, including ratio of signal strength (for example, corrected for transmission power variations, if any) for known anchors and raw signal strengths for unknown anchors.

In operation 740, for anchors with unknown positions, motion models in unobserved time are created. These motion models may model how a signal might be changing. Examples of motion models in unobserved time include, but are not limited to: simple shift from one strength/pose to another (e.g., relocation of a Wi-Fi router, open door versus closed door, etc.); temporal shift from one strength/pose to another (e.g., relocation of Wi-Fi router in a food truck); and unknown shifts as fast frequencies such as vibration, weather conditions, etc. (these anchors may be marked for only fingerprinting and not high fidelity localization).

In operation 750, one or more signal layers are used to create probable position and transmission characteristics (e.g., signal trajectory perpendicular to antenna on router according to identified model of router) of anchors with unknown position, constrained by data taken so far, including multiple models with varying complexity (such as mixture-model, Monte Carlo Markov Chain, etc.).

In operation 760, for anchors with a valid model for motion and a valid transmission characteristic, probable areas for each valid combination are computed.

In operation 770, the computed probable areas are used to update the GIS layer with fingerprinting data of visible anchors to create probable areas for future user equipment data.

In operation 780, any anchor whose pose and transmission characteristics are now known with high confidence (e.g., above a preset threshold) are added to the known list.

In operation 790, parallel processes are used to fill in the holes in the world model.

Figure 8:
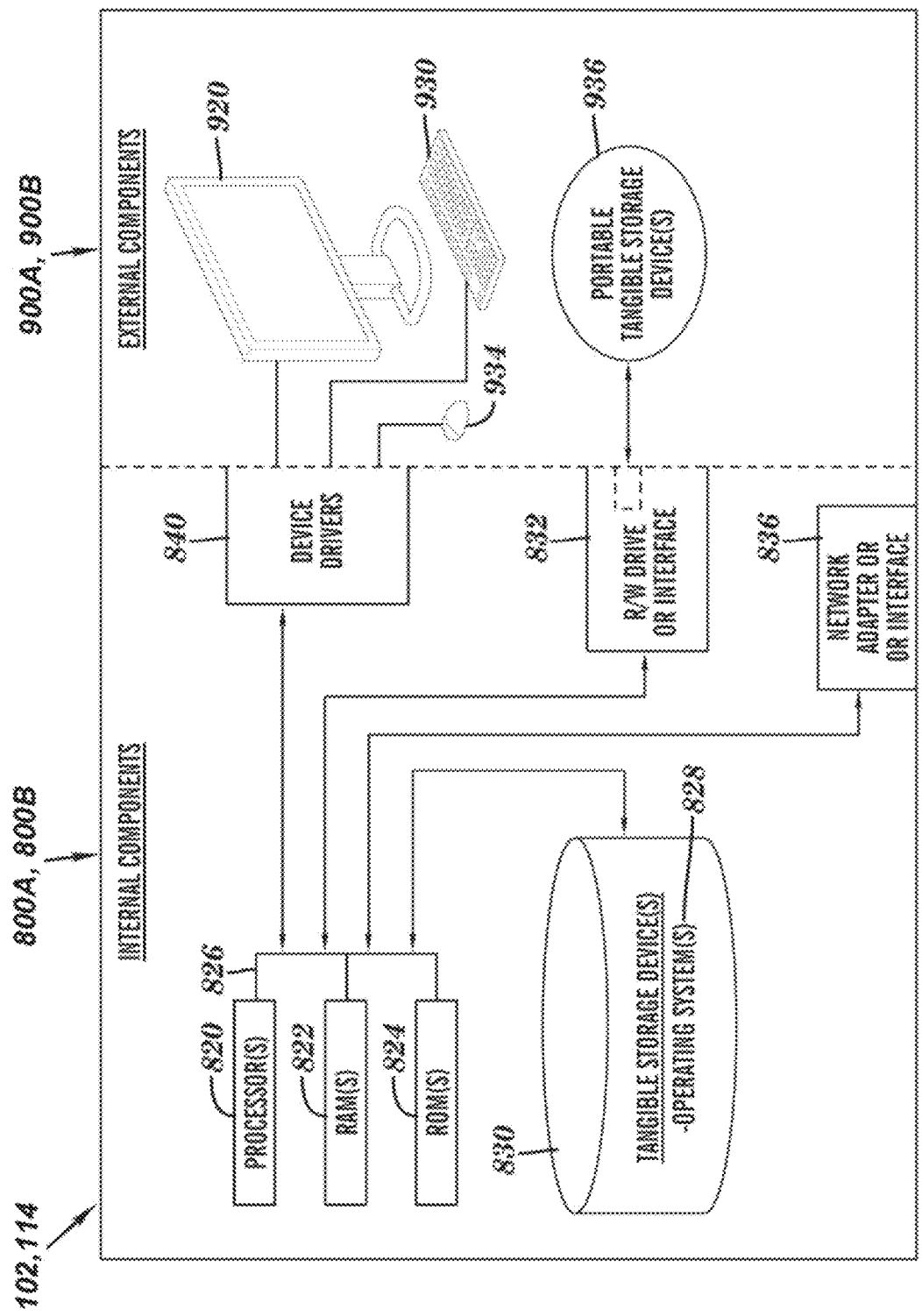
FIG. 8 is a block diagram of internal and external components of computers and servers depicted in FIG. 1 according to at least one embodiment.

FIG. 8 is a block diagram of internal and external components of computers 102 and 114 depicted in FIG. 1 in accordance with an illustrative embodiment. It should be appreciated that FIG. 8 provides only an illustration of one implementation and does not imply any limitations with regard to the environments in which different embodiments may be implemented. Many modifications to the depicted environments may be made based on design and implementation requirements.

Computer 102 (FIG. 1), such as a mobile device, and server computer 114 (FIG. 1), such as a device in a base station, may include respective sets of internal components 800A,B and external components 900A,B illustrated in FIG. 8. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the device localization program (e.g., GPS Enhancement Program 116 (FIG. 1)) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the GPS Enhancement Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the device localization program (e.g., GPS Enhancement Program 116 (FIG. 1)) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the device localization program (e.g., GPS Enhancement Program 116) on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of determining a location of a mobile device, the method comprising:
    receiving, by a base station, GPS data and signal strength data from a mobile device, wherein the GPS data and the signal strength data are associated with a location of the mobile device;
    obtaining a world model database corresponding to a physical location of the base station, the base station being among a plurality of base stations each of which stores a different world model database respectively corresponding to a vicinity thereof;
    obtaining a geographic information system (GIS) layer of the world model database including information one or more of a building, a road, a bridge, a tunnel, a landform, and a body of water;
    obtaining one or more signal strength layers of the world model database corresponding to one or more signals from one or more sources having a known position and a known signal transmission strength;
    constraining the GPS data and the signal strength data based on the world model database and on a minimum number of anchors;
    updating the world model database based on the GPS data and the signal strength data received from the mobile device,
    determining a conflict with at least one anchor included in the world model database based on the at least one anchor not being detected within the signal strength data,
    reducing the minimum number of anchors based on the determined conflict;
    producing a constrained location of the mobile device by applying the GIS layer and the one or more signal strength layers of the world model database to an initial location of the mobile device, based on a probability value associated with the GIS layer and the one or more signal strength layers exceeding a first threshold value; and
    sending the constrained location to the mobile device.

2. The method of claim 1, wherein the world model database further includes one or more layers, the one or more layers comprising at least one of:
   a magnetic field deviation layer; and
   a weather layer; and
   wherein the one or more signals comprise one or more of a Wireless Fidelity (Wi-Fi) signal, a Bluetooth signal, a global positioning system (GPS) signal, and a cellular network signal.

3. The method of claim 2, wherein the one or more signal strength layers are configured to:
   provide a signal strength at a position, using data from the GIS, for the one or more sources having the known position and the known signal transmission strength; and
   model the one or more signals for signal strength propagation loss for one or more sources having uncertainty in either the position or signal transmission strength.

4. The method of claim 2, wherein the constraining the GPS data and the signal strength data comprises:
   setting the initial location of the mobile device based on the GPS data from the mobile device; and
   applying the one or more layers of the world model database to the set initial location based on the probability value associated with the GIS layer and the one or more signal strength layers exceeding the first threshold value.

5. The method of claim 2, further comprising optimizing the world model database.

6. The method of claim 5, wherein the optimizing the world model database comprises:
   updating the one or more layers based on the GPS data and the signal strength data or data received from one or more additional mobile devices;
   determining a probability of position and transmission characteristics for the updated one or more layers; and
   whitelisting one or more anchors with position and transmission characteristics having a probability greater than a second threshold value.

7. The method of claim 1, wherein the GPS data and the signal strength data comprises at least one of:
   a time associated with the mobile device;
   a position of the mobile device based on one or more GPS signals;
   a velocity of the mobile device based on the one or more GPS signals;
   a signal strength value of the one or more GPS signals;
   a list of one or more Wireless Fidelity (Wi-Fi) access points available to the mobile device;
   a signal strength value of the one or more available Wi-Fi access points;
   a list of one or more Bluetooth beacons available to the mobile device;
   a signal strength value of the one or more available Bluetooth beacons;
   a list of one or more cellular network base stations available to the mobile device;
   a signal strength value for one or more channels of the one or more available cellular network base stations;
   a magnetic field vector based on a strength value and a direction at the position of the mobile device;
   inertial measurement unit data associated with the mobile device;
   ambient temperature data associated with the location of the mobile device;
   atmospheric humidity data associated with the location of the mobile device; and
   atmospheric pressure data associated with the location of the mobile device.

8. A computer system of a base station for determining a location of a mobile device, the computer system comprising:
   one or more computer-readable non-transitory storage media configured to store computer program code; and
   one or more computer processors configured to access said computer program code and operate as instructed by said computer program code, said computer program code comprising:
      receiving code configured to cause the one or more computer processors to receive GPS data and signal strength data from a mobile device, wherein the GPS data and the signal strength data are associated with a location of the mobile device;
      first obtaining code configured to cause the one or more computer processors to obtain a world model database corresponding to a physical location of the base station, the base station being among a plurality of base stations each of which stores a different world model database respectively corresponding to a vicinity thereof;
      second obtaining code configured to cause the one or more computer processors to obtain a geographic information system (GIS) layer of the world model database including information one or more of a building, a road, a bridge, a tunnel, a landform, and a body of water;
      third obtaining code configured to cause the one or more computer processors to obtain one or more signal strength layers of the world model database corresponding to one or more signals from one or more sources having a known position and a known signal transmission strength;
      constraining code configured to cause the one or more computer processors to constrain the GPS data and the signal strength data based on the world model database and on a minimum number of anchors; and
      first updating code configured to cause the one or more computer processors to update the world model database based on the GPS data and the signal strength data received from the mobile device,
      first determining code configured to cause the one or more computer processors to determine a conflict with at least one anchor included in the world model database based on the at least one anchor not being detected within the signal strength data;
      reducing code configured to cause the one or more computer processors to reduce the minimum number of anchors based on the determined conflict;
      producing code configured to cause the one or more computer processors to produce a constrained location of the mobile device by applying the GIS layer and the one or more signal strength layers of the world model database to an initial location of the mobile device, based on a probability value associated with the GIS layer and the one or more signal strength layers exceeding a first threshold value; and
      sending code configured to cause the one or more computer processors to send the constrained location to the mobile device.

9. The computer system of claim 8, wherein the world model database further includes one or more layers, the one or more layers comprising at least one of:
   a magnetic field deviation layer; and
   a weather layer; and wherein the one or more signals comprises one or more of a Wireless Fidelity (Wi-Fi) signal, a Bluetooth signal, a global positioning system (GPS) signal, and a cellular network signal.

10. The computer system of claim 9, wherein the one or more signal strength layers are configured to:
provide a signal strength at a position, using data from the GIS, for the one or more sources having the known position and the known signal transmission strength; and
model the one or more signals for signal strength propagation loss for one or more sources having uncertainty in either the position or signal transmission strength.

11. The computer system of claim 9, wherein the constraining code comprises:
setting code configured to cause the one or more computer processors to set the initial location of the mobile device based on the GPS data from the mobile device; and
applying code configured to cause the one or more computer processors to apply the one or more layers of the world model database to the set initial location based on the probability value associated with the GIS layer and the one or more signal strength layers exceeding the first threshold value.

12. The computer system of claim 9, wherein said computer program code further comprises optimizing code configured to cause the one or more computer processors to optimize the world model database.

13. The computer system of claim 12, wherein the optimizing code comprises:
second updating code configured to cause the one or more computer processors to update the one or more layers based on the GPS data and the signal strength data or data received from one or more additional mobile devices;
second determining code configured to cause the one or more computer processors to determine a probability of position and transmission characteristics for the updated one or more layers; and
whitelisting code configured to cause the one or more computer processors to whitelist one or more anchors with position and transmission characteristics having a probability greater than a second threshold value.

14. The computer system of claim 8, wherein the GPS data and the signal strength data comprises at least one of:
a time associated with the mobile device;
a position of the mobile device based on one or more GPS signals;
a velocity of the mobile device based on the one or more GPS signals;
a signal strength value of the one or more GPS signals;
a list of one or more Wireless Fidelity (Wi-Fi) access points available to the mobile device;
a signal strength value of the one or more available Wi-Fi access points;
a list of one or more Bluetooth beacons available to the mobile device;
a signal strength value of the one or more available Bluetooth beacons;
a list of one or more cellular network base stations available to the mobile device;
a signal strength value for one or more channels of the one or more available cellular network base stations;
a magnetic field vector based on a strength value and a direction at the position of the mobile device;
inertial measurement unit data associated with the mobile device;
ambient temperature data associated with the location of the mobile device;
atmospheric humidity data associated with the location of the mobile device; and
atmospheric pressure data associated with the location of the mobile device.

15. A non-transitory computer readable medium having stored thereon a computer program for determining a location of a mobile device, the computer program configured to cause one or more computer processors of a computing device of a base station to:
receive GPS data and signal strength data from a mobile device, wherein the GPS data and the signal strength data are associated with a location of the mobile device;
obtain a world model database corresponding to a physical location of the base station, the base station being among a plurality of base stations each of which stores a different world model database respectively corresponding to a vicinity thereof;
obtain a geographic information system (GIS) layer of the world model database including information one or more of a building, a road, a bridge, a tunnel, a landform, and a body of water;
obtain one or more signal strength layers of the world model database corresponding to one or more signals from one or more sources having a known position and a known signal transmission strength;
constrain the GPS data and the signal strength data based on the world model database and on a minimum number of anchors;
update the world model database based on the GPS data and the signal strength data received from the mobile device,
determine a conflict with at least one anchor included in the world model database based on the at least one anchor not being detected within the received signal strength data,
reduce the minimum number of anchors based on the determined conflict;
produce a constrained location of the mobile device by applying the GIS layer and the one or more signal strength layers of the world model database to an initial location of the mobile device, based on a probability value associated with the GIS layer and the one or more signal strength layers exceeding a first threshold value; and
send the constrained location to the mobile device.

16. The computer readable medium of claim 15, wherein the world model database further includes one or more layers, the one or more layers comprising at least one of:
a magnetic field deviation layer; and
a weather layer; and
wherein the one or more signals comprises one or more of a Wireless Fidelity (Wi-Fi) signal, a Bluetooth signal, a global positioning system (GPS) signal, and a cellular network signal.

17. The computer readable medium of claim 16, wherein the one or more signal strength layers are configured to:
provide a signal strength at a position, using data from the GIS, for the one or more sources having the known position and the known signal transmission strength; and
model the one or more signals for signal strength propagation loss for one or more sources having uncertainty in either the position or signal transmission strength.

18. The computer readable medium of claim 16, wherein the computer program is configured to cause the one or more computer processors to constrain the GPS data and the signal strength data by:
- setting the initial location of the mobile device based on the GPS data from the mobile device; and
- applying the one or more layers of the world model database to the set initial location based on the probability value associated with the GIS layer and the one or more signal strength layers exceeding the first threshold value.

19. The computer readable medium of claim 16, wherein the computer program is further configured to cause the one or more computer processors to optimize the world model database by:
- updating the one or more layers based on the GPS data and the signal strength data or data received from one or more additional mobile devices;
- determining a probability of position and transmission characteristics for the updated one or more layers; and
- whitelisting one or more anchors with position and transmission characteristics having a probability greater than a second threshold value.

20. The computer readable medium of claim 15, wherein the GPS data and the signal strength data comprises one or more of:
- a time associated with the mobile device;
- a position of the mobile device based on one or more GPS signals;
- a velocity of the mobile device based on the one or more GPS signals;
- a signal strength value of the one or more GPS signals;
- a list of one or more Wireless Fidelity (Wi-Fi) access points available to the mobile device;
- a signal strength value of the one or more available Wi-Fi access points;
- a list of one or more Bluetooth beacons available to the mobile device;
- a signal strength value of the one or more available Bluetooth beacons;
- a list of one or more cellular network base stations available to the mobile device;
- a signal strength value for one or more channels of the one or more available cellular network base stations;
- a magnetic field vector based on a strength value and a direction at the position of the mobile device;
- inertial measurement unit data associated with the mobile device;
- ambient temperature data associated with the location of the mobile device;
- atmospheric humidity data associated with the location of the mobile device; and
- atmospheric pressure data associated with the location of the mobile device.

* * * * *